June 20, 1972 J. E. PASEK ET AL 3,671,085

ANTILOCK BRAKE MODULATOR

Filed Oct. 12, 1970 2 Sheets-Sheet 1

INVENTORS
James E. Pasek &
BY Charles D. Woodward
D. D. McGraw
ATTORNEY

ANTILOCK BRAKE MODULATOR

INVENTORS
James E. Pasek &
BY Charles D. Woodward
D. D. McGraw
ATTORNEY

United States Patent Office 3,671,085

Patented June 20, 1972

3,671,085

ANTILOCK BRAKE MODULATOR

James E. Pasek, Saginaw, Mich., and Charles D. Woodward, Louisville, Ky., assignors to General Motors Corporation, Detroit, Mich.

Filed Oct. 12, 1970, Ser. No. 80,006
Int. Cl. B60t 8/12
U.S. Cl. 303—21 F 3 Claims

ABSTRACT OF THE DISCLOSURE

A brake antilock modulator of the type having a plunger forming a wall which is movable by hydraulic pressure in response to the sensed wheel condition to cyclically decrease and increase the brake fluid pressure applied to the controlled brake is provided with a valve which normally allows free fluid communication between the master cylinder and the controlled brake while blocking fluid communication with the modulator plunger to eliminate the need for a plunger supporting spring.

The invention relates to an antilock brake modulator and more particularly to an antilock brake modulator having a valve which normally allows free fluid communication between the master cylinder and the wheel brake means while blocking brake fluid communication with the modulator plunger.

In a fluid pressure modulator of the type having a plunger forming a movable wall intermediate the master cylinder and the wheel brake it is necessary to provide a means of supporting the plunger against the brake fluid pressure acting thereon. The common expedient found in the prior art is the provision of a spring which is capable of supporting the modulator plunger against the pressure of the brake fluid. Inasmuch as some power boosted master cylinders provide brake fluid pressures in excess of 2,000 p.s.i., the size of the spring necessary to support the modulator plunger becomes troublesome due to economic and modulator unit size limitations. It is therefore the principal object of the present invention to provide an improved antilock brake modulator having a valve means which isolates the modulator plunger from communication with the brake fluid pressure during normal brake operation.

The antilock brake modulator of this invention includes a housing having brake fluid inlet and outlet chambers which are connected by first and second parallel fluid passages. A check valve prevents brake fluid flow from the inlet chamber to the second passage. A modulator valve assembly which selectively permits fluid communication between the outlet chamber and either the first or second passage is spring biased to normally block fluid communication with the second chamber and includes a cylindrical portion which is slidably engaged in the housing and forms therewith a variable volume chamber which communicates with the brake fluid outlet chamber. A hydraulic force is thereby provided by the brake fluid pressure to hold the modulator valve in position blocking the second passage. A plunger slidably engaged in the housing forms a wall of the second passage. A solenoid operated control valve receiving operating fluid from the power steering pump is electrically actuable by signals received from a suitable electronic logic control to channel pressurized fluid to first and second pistons which are respectively associated with the modulator control valve and the plunger. When the control valve is shifted in one direction fluid communication between the master cylinder and the controlled wheel brake is blocked, fluid communication between the second passage and the brake fluid outlet chamber is opened, and the plunger is withdrawn increasing the volume of the second passage and decreasing the brake fluid pressure communicated to the vehicle wheel brake. The control valve is shifted in the other direction when the impending wheel lock condition has been arrested channeling pressurized fluid to the first and second pistons to hold the modulator valve in its position allowing fluid communication with the second passage and forcibly moving the plunger to decrease the volume of the second passage, thereby reapplying brake pressure to the vehicle wheel brake. The plunger is unseatingly engageable with the check valve upon full travel in the brake reapplying direction to permit flow of additional fluid from the brake fluid inlet chamber to the second passage to provide higher pressure at the control wheel brake to compensate for brake fade. The control valve is returned to its normal position when the vehicle has been brought to a stop or the excessive master cylinder generated fluid pressure is released by the vehicle operator thereby allowing the plunger and the modulator valve to return to their normal positions.

Figure 1:
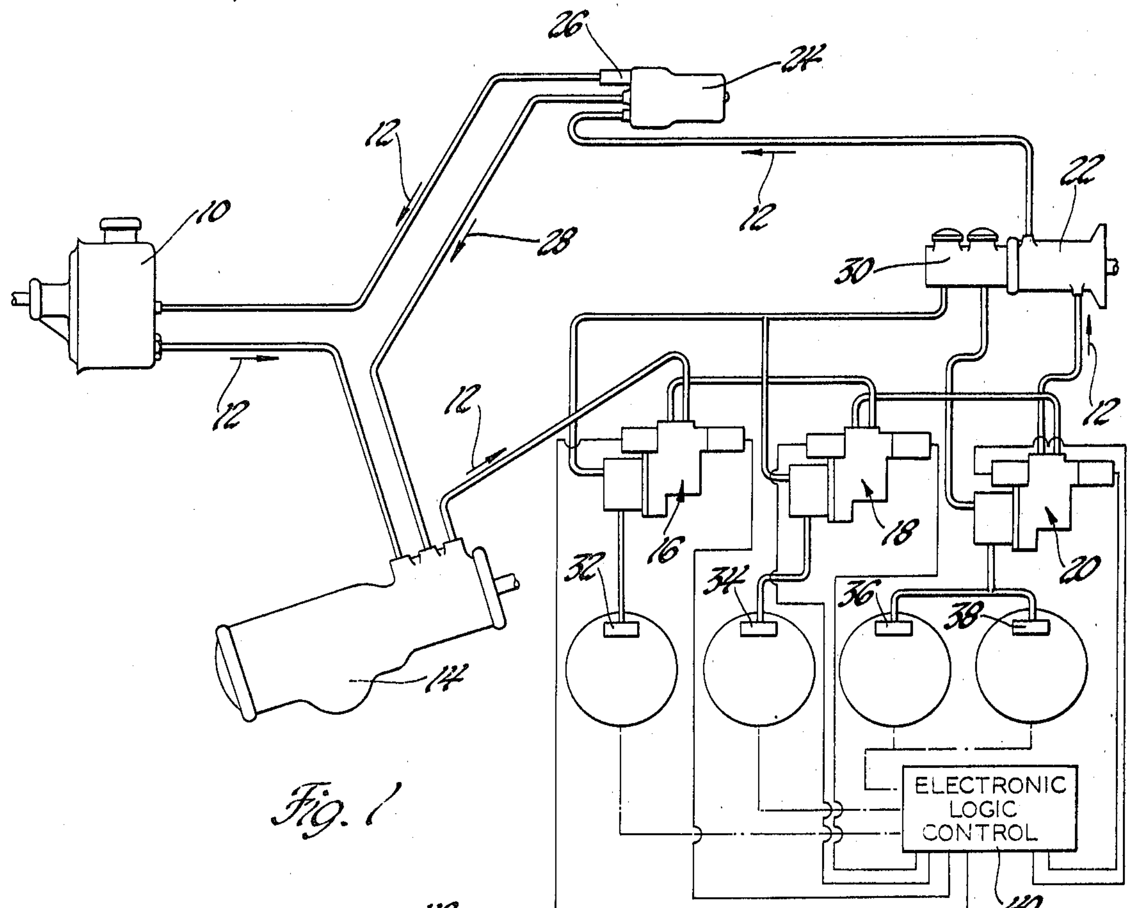
FIG. 1 is a schematic illustration of a brake antilock circuit embodying the invention.

Referring to FIG. 1, the brake antilock circuit includes a power steering pump 10 which provides a constant flow of operating fluid circulated in the direction or arrows 12. Operating fluid flow through the antilock brake modulator circuit is normally in the direction of arrows 12 through the steering gear 14, the series connected modulators 16, 18 and 20, the open-center brake booster 22, and the electro-hydraulic reserve pump 24 to the reservoir of power steering pump 10. Flow switch 26 senses a termination of operating fluid flow through the circuit upon failure of the power steering pump 10 and starts the electro-hydraulic reserve pump resulting in operating fluid flow in the direction of arrow 28 so as to bypass the inoperative power steering pump 10 and prevent the loss of power assisted steering and braking. Master cylinder 30 is actuated by the open-center brake booster 22 and is illustrated as being of the dual pressure chamber type with the front chamber communicating brake fluid to the open-center modulators 16 and 18 which are located fluidly intermediate the master cylinder 30 and the front vehicle wheel brakes 32 and 34. Modulator 20 receives brake fluid from the rear chamber of master cylinder 30 and is located intermediate the master cylinder and the rear wheel brakes 36 and 38. The electronic logic control 40 senses the condition of the vehicle wheels and provides an electrical operating signal for the modulators 16, 18 and 20.

Figure 2:
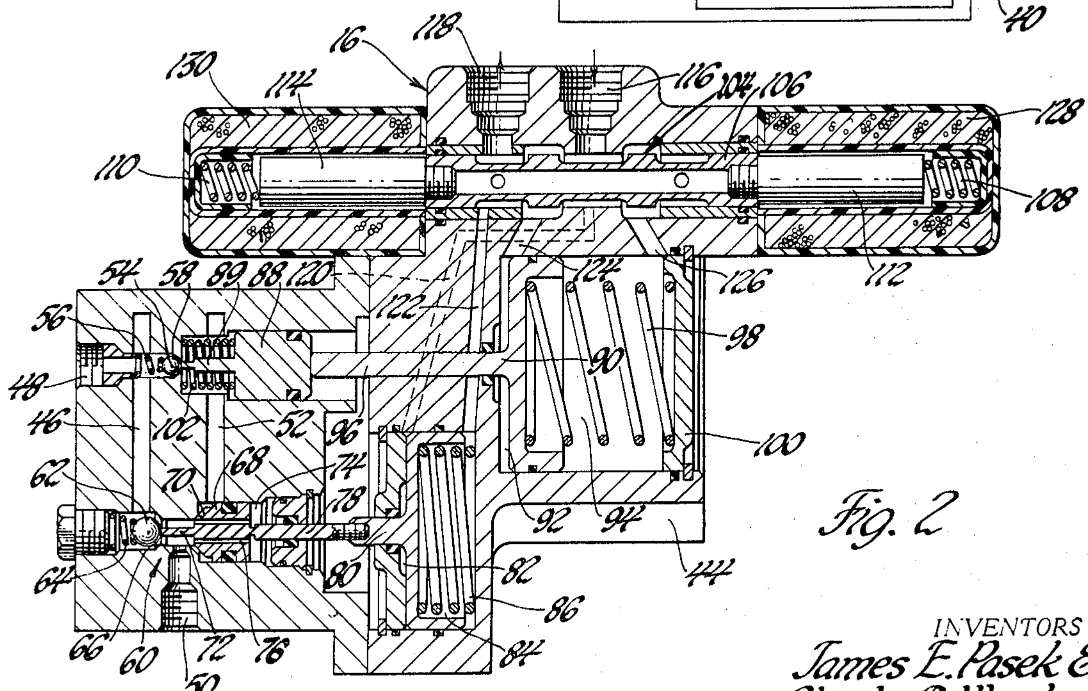
FIG. 2 is a cross-sectional view of the antilock brake modulator shown in the normal braking mode of operation.

Referring to FIGS. 2, the modulator 16, which is operationally identical to modulators 18 and 20, includes a housing 44 in which fluid passage 46 connects the brake fluid inlet port 48 which communicates with the master cylinder 30 and the brake fluid outlet port 50 which communicates with the vehicle wheel brake 32. Fluid passage 52 is located in housing 44 in parallel fluid flow relationship with fluid passage 46. Fluid passage 52 is normally isolated from the fluid inlet port 48 by check ball 54 which is biased by spring 56 into closure of the annular valve seat 58 formed in housing 44. A modulator valve assembly, indicated generally at 60, selectively permits fluid communication between the brake fluid outlet port 50 and either the passage 46 or 52. Modulator valve 60 includes check ball 62 which is biased by valve spring 64 toward engagement with the annular valve seat 66 to block fluid communication between the fluid passage 46 and the brake fluid outlet port 50. Valve member 68 provides closure of annular valve port 70 formed in fluid passage 52 to block fluid communication between fluid passage 52 and brake fluid outlet port 50. Valve member 68 includes a pin 72 of sufficient length to engage and hold unseated check ball 62 when valve member 68 is seated at annular valve seat 70. The end of valve member 68 opposite pin 72 is sealingly slidable in housing 44, forming therewith an expansible chamber 74 which communicates with the brake fluid outlet port 50 through the fluid passages 76 which extend axially through the valve member 68. The end area of valve member 68 forming a movable wall of expansible chamber 74 is greater than the opposing area of valve member 68 which, when seated at annular valve seat 70, is acted upon by the brake fluid pressure in the brake fluid outlet port 50. A hydraulic force is thereby provided which holds the valve member 68 seated at annular valve seat 70. Rod 78 is attached to valve member 68 and sealingly extends through housing 44 into attachment with a first piston 80 which is movable in housing 44 and forms therewith variable volume chambers 82 and 84. Spring 86 engages piston 80 and acts through rod 78 to hold valve member 68 seated at annular valve seat 70 when there is no brake fluid pressure acting on valve member 68.

Plunger 88 is sealingly slidable in housing 44 and forms a movable wall of fluid passage 52. Piston 90 is sealingly slidable in housing 44, forming therewith variable volume chambers 92 and 94. Rod 96 of piston 90 sealingly extends through housing 44 into free abutting engagement with plunger 88. Spring 98 is seated at closure member 100 of housing 44 and acts through piston 90 to urge the abutting plunger 88 into engagement with spring 102. Spring 102 forms a yieldable stop which normally limits movement of plunger 88 and its pin 89 short of operative engageemnt with check ball 54. Spring 102 forms a yieldable stop which can be overcome by the force of fluid pressure in variable volume chamber 94 allowing pin 89 to unseat check ball 54, thereby permitting fluid communication between passages 46 and 52.

A control valve, indicated generally at 104, selectively channels pressurized fluid to the variable volume chambers of pistons 80 and 90 to respectively control modulator valve assembly 60 and plunger 88. The control valve 104 includes a valve spool 106 which is slidable in housing 44. Valve spool 106 is spring-centered by springs 108 and 110 acting through the iron cores 112 and 114 which are attached at either end of valve spool 106. In the spring-centered position, the control valve 104 permits fluid flow from inlet port 116, which receives operating fluid from the power steering pump 10 to the outlet port 118. This unrestricted fluid flow through the control valve 104 results in fluid being communicated to variable volume chambers 82, 84, 92 and 94, respectively, through fluid passages 120, 122, 124, and 126 at substantially zero pressure. Solenoid coils 128 and 130 respectively encircle iron cores 112 and 114 to shift the valve spool 106 upon energization by an electric signal generated by the electronic logic control 40.

OPERATION

Referring to FIG. 2, the modulator 16 is shown in the normal braking mode of operation. Solenoid coils 128 and 130 are deenergized allowing unrestricted fluid flow from inlet port 116 to outlet port 118 and communicating fluid at substantially zero pressure to the variable volume chambers of pistons 80 and 90. Spring 86 acts through piston 80 and rod 78 to hold valve member 68 seated at annular valve seat 70, thereby isolating fluid passage 52 from brake fluid outlet port 50 and unseating check ball 62. Spring 98 urges plunger 88 into engagement with the yieldable stop formed by spring 102. When the brakes are applied, master cylinder generated brake fluid pressure is communicated to brake fluid inlet port 48, through passage 46, annular valve seat 66, and fluid passage 76 to act on the end area of valve member 68 in expansible chamber 74 to hold valve member 68 seated at annular valve seat 70 against the force of brake fluid pressure acting on the opposing area of valve member 68. Free fluid communication is thereby maintained through passage 46 between the brake fluid inlet port 48 and the brake fluid outlet port 50.

Figure 3:
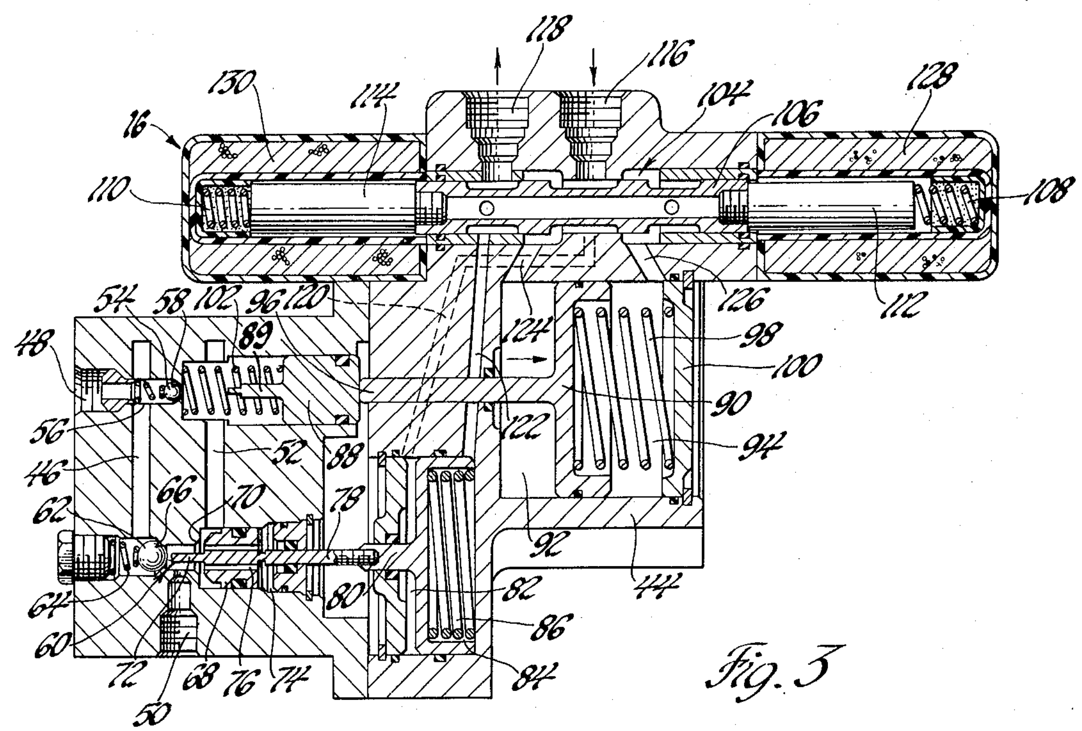
FIG. 3 is a cross-sectional view of the antilock brake pressure modulator shown in the brake releasing mode of antilock operation.

When application of excessive brake pressure to the vehicle wheel results in an incipient wheel lock condition, the electronic logic control 40 senses the excessive rate of wheel deceleration and triggers the brake release mode of antilock operation by providing an electrical signal for the energization of solenoid coil 130. Energization of solenoid coil 130 causes valve member 106 to shift leftwardly as shown in FIG. 3, thereby restricting fluid flow between inlet port 116 and outlet port 118 and channeling the resulting increased pressure through fluid passages 120 and 124. The fluid pressure communicated through passage 120 to variable volume chamber 82 overcomes spring 86 and the hydraulic force acting on valve member 68 thereby shifting piston 80 and the attached valve member 68 rightwardly. Rightward movement of valve member 68 sequentially unseats valve member 68 from annular valve seat 70 and allows seating of check ball 62 at annular valve seat 66. The seating of check ball 62 results in isolation of the vehicle wheel brake 32 from the master cylinder 30. The communication of pressurized operating fluid through passage 124 increases the pressure in variable volume chamber 92 and acts against piston 90 moving it rightwardly compressing spring 98. The brake fluid pressure which is communicated through annular valve port 70 from brake fluid outlet port 50 to the fluid passage 52 acts on plunger 88 causing it to follow the abutting piston 90 rightwardly. This rightward movement of plunger 88 increases the volume of fluid passage 52 thereby decreasing the brake fluid pressure at the vehicle brake 32 to allow the vehicle wheel to accelerate. It is noted that while shifting of the valve spool 106 from the normal position blocks fluid flow from inlet port 116 to outlet port 118, the operating fluid displaced by movement of pistons 80 and 90 is communicated to outlet port 118 thereby maintaining a constant flow of operating fluid through the circuit in the direction of arrows 12.

Figure 4:
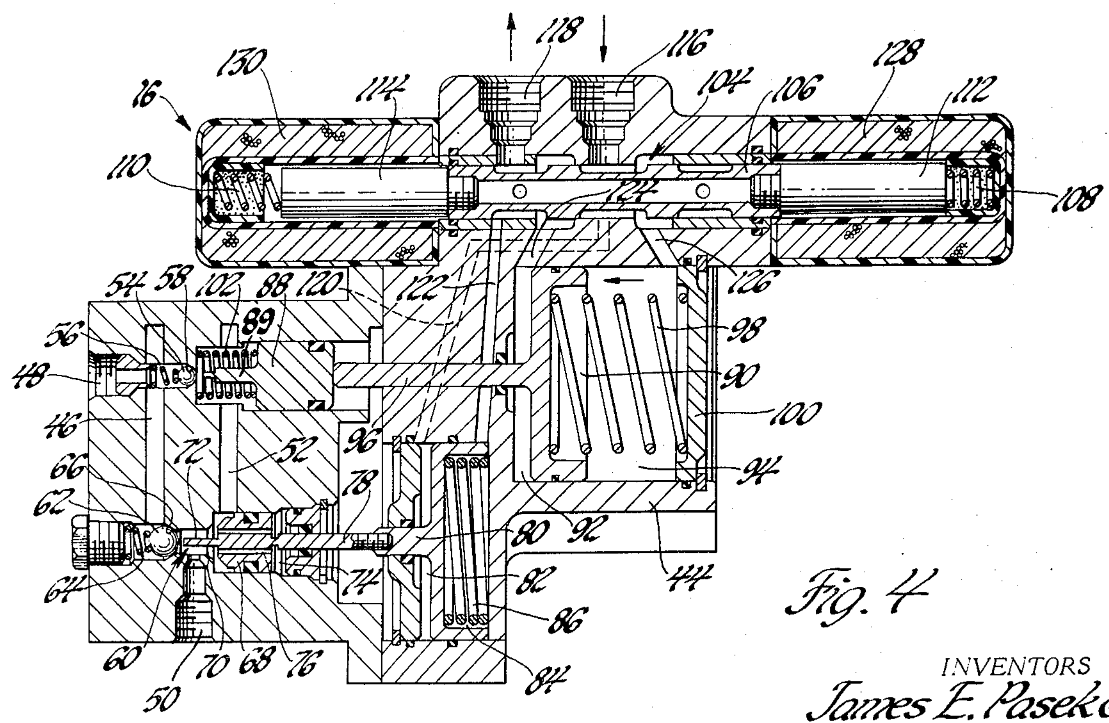
FIG. 4 is a cross-sectional view of the antilock brake modulator shown in the brake applying mode of antilock operation.

When the vehicle wheel has accelerated to an acceptable level, the electronic logic control 40 triggers the brake reapply mode of antilock operation by deenergizing solenoid coil 130 and energizing solenoid coil 128, thereby shifting valve spool 106 rightwardly as shown in FIG. 4. The resulting fluid flow restriction between inlet port 116 and outlet port 118 causes a fluid pressure increase which is communicated through passage 120 and 126. The fluid pressure communicated through passage 120 holds piston 80 in its rightward position. The speed at which valve spool 106 shifts from its leftward to its rightward position and the size of the passage 120 prevent even momentary loss of fluid pressure in variable volume chamber 82 which would permit spring 86 to shift valve member 68. The rightward shifting of valve spool 106 communicates increased operating fluid pressure through passage 126 to variable volume chamber 94 forcing piston 90 leftwardly carrying the abutting plunger 88 therewith to forcibly decrease the volume of fluid passage 52 thereby increasing the brake fluid pressure at the vehicle wheel brake 32. At the same time, fluid communication is opened between variable volume chamber 92 and outlet port 118 to drain operating fluid from the variable volume chamber 92. If, during this brake applying mode of antilock operation, the brake pressure again exceeds the allowable amount, the electronic logic control 40 again causes valve spool 106 to be shifted leftwardly holding valve member 68 unseated and causing plunger 88 to again release the brake fluid pressure. The cycle of releasing pressure from the vehicle wheel brake and reapplying the pressure is continued until the vehicle is either brought to a stop or the excessive brake fluid pressure is released by the vehicle operator. Should brake fade occur during this cycle of operation requiring higher brake fluid pressures at the vehicle wheel brake 32 to approach the locked wheel condition than when the antilock cycle began, the valve spool 106 is held in its rightward position causing overtravel of piston 90 and plunger 88 leftwardly. The leftward overtravel of plunger 88 causes spring 102 to yield allowing pin 89 to unseatingly engage check ball 54 allowing communication of additional brake fluid from the brake fluid inlet port 48 to the fluid passage 52. When the additional brake fluid pressure has been comunicated to the vehicle wheel brake means and the locked wheel condition has again been approached, valve spool 106 is shifted leftwardly causing piston 90 and abutting plunger 88 to move rightwardly disengaging pin 89 from check ball 54, closing annular valve port 58 and again isolating the vehicle brake means from the master cylinder 30.

If during the release or reapply cycle of antilock operation the vehicle operator releases pedal pressure, thereby decreasing the brake fluid pressure communicated to the brake fluid inlet port 48, the pressure differential between brake fluid outlet port 50 and brake fluid inlet port 48 unseats check ball 54 to return brake fluid to the master cylinder reservoir. When the wheel locking condition has been arrested through this release of brake fluid pressure or by the vehicle having been brought to a stop, the electronic logic control removes the electrical actuating signal from both solenoid coils 128 and 130 allowing springs 108 and 110 to center valve spool 106 thereby restoring free fluid communication between inlet port 116 and outlet port 118. The operating fluid pressure at the variable volume chambers of pistons 80 and 90 is thereby returned to substantially zero allowing spring 98 to return piston 90 to its rest position as defined by spring 102 acting upon plunger 88, and valve member 68 is seated and ball check 62 unseated at the urging of spring 86 which acts on piston 80. It is noted that the return of piston 90 and plunger 88 to their normal position is dependent upon the brake fluid pressure at brake fluid inlet port 48 being less than the brake fluid pressure remaining in fluid passage 52 so that check ball 54 can be unseated to allow excessive brake fluid remaining in fluid passage 52 to be removed.

Thus, an antilock brake modulator has been provided which isolates the modulator plunger from communication with the brake fluid pressure during normal brake operation, thereby eliminating the problem of supporting the modulator plunger against the brake fluid pressure acting thereon.

What is claimed is:

1. A pressure modulator operable in response to variations in sensed condition for use in a system having pump means providing a constant flow of operating fluid and comprising:

a housing having a fluid inlet means and fluid outlet means;

a first passage formed in said housing connecting said fluid inlet means and said fluid outlet means;

a plunger cavity in said housing connected to said fluid outlet means;

modulator valve means in said housing having a normal position permitting fluid communication through said first passage and blocking fluid communication between said plunger cavity and said fluid outlet means, said modulator valve means being shiftable to a second position blocking fluid communication through said first passage and opening fluid communication between said plunger cavity and said fluid outlet means;

means selectively holding said modulator valve means in said normal position;

first pressure responsive means in said housing associated with said modulator valve means;

a modulator plunger sealingly slidable in said housing and forming a movable wall of said plunger cavity;

second pressure responsive means in said housing associated with said modulator plunger;

and control valve means receiving operating fluid from said pump means and channeling pressurized fluid to said first and second pressure responsive means, said control valve means shiftable in one direction in response to said sensed condition whereby said modulator valve means is shifted to said second position and said modulator plunger is moved to increase the volume of said plunger cavity to decrease the pressure at said fluid outlet means, said valve means shiftable to a second position whereby said modulator plunger is moved to decrease the volume of said plunger cavity to increase the pressure at said fluid outlet means and said modulator valve means is held in said second position, said control valve means returnable to a normal position whereby said modulator valve means is returned to said normal position.

2. A pressure modulator operable in response to variations in a sensed condition for use in a system having pump means providing a constant flow of operating fluid and comprising:

a housing having fluid inlet means communicating fluid pressure from a pressure source and fluid outlet means communicating fluid pressure to a fluid pressure operated apparatus;

a first passage formed in said housing connecting said fluid inlet means and said fluid outlet means;

a plunger cavity in said housing communicating with said fluid outlet means;

modulator valve means in said housing have a normal position permitting fluid communication through said first passage and blocking fluid communication with said plunger cavity, said modulator valve means being shiftable to a second position blocking fluid communication through said first passage and opening fluid communication between said plunger cavity and said fluid outlet means, a portion of said modulator valve means forming with said housing a chamber of variable volume, the end area of said modulator valve means portion in said variable chamber having a great area than the opposing area of said modulator valve means acted upon by pressure from said fluid outlet means when said valve means is in said normal position;

fluid passage means communicating pressure from said fluid outlet means to said variable volume chamber to hold said modulator valve in said normal position;

first pressure responsive means in said housing attached to said modulator valve;

a modulator plunger sealingly slidable in said housing and forming a movable wall of said plunger cavity;

second pressure responsive means in said housing engaging said modulator plunger;

and control valve means being shiftable in response to said sensed condition and receiving operating fluid from said pump means, said control valve means having a normal position channeling fluid at substantially zero pressure to said first and second pressure responsive means, said valve means shiftable in one direction to channel pressurized fluid to said first and second pressure responsive means whereby said modulator valve means is shifted to said second position and said modulator plunger is moved to increase the volume of said plunger cavity to release said outlet chamber pressure, said valve means shiftable in the other direction to channel pressurized fluid to said first and second pressure responsive members whereby said modulator plunger is forcibly moved to decrease the volume of said plunger cavity to increase said outlet chamber pressure and said modulator valve means is held in said second position, said control valve means shiftable to the normal position channeling fluid at substantially zero pressure to said first and second pressure responsive members whereby said modulator valve means is shifted to said normal position.

3. A brake pressure modulator operable in response to variations in a sensed condition for use in a wheel antilock system having pump means providing a constant flow of operating fluid and comprising:

a housing having fluid inlet means communicating fluid pressure from a pressure source and fluid outlet means communicating fluid pressure to a fluid pressure operated wheel brake means;

first and second passages formed in said housing and in parallel flow relationship connecting said fluid inlet means and said fluid outlet means;

modulator valve means in said housing having a normal position permitting fluid communication through only said first passage and shiftable to a second position permitting fluid communication through only said second passage, said modulator valve means having a cylindrical portion sealingly extending through the wall of said second passage and forming with said housing a chamber of variable volume, said cylindrical portion having a greater end area than the opposing area of said modulator valve means acted upon by pressure from said fluid outlet means when said valve means is in said normal position;

fluid passage means communicating pressure from said fluid outlet means to the said variable volume chamber to hold said modulator valve in said normal position;

first pressure responsive means in said housing attached to said modulator valve;

first spring means acting on said modulator valve and providing a sufficient force to hold said normal position thereof when said pressure in said fluid outlet means is zero;

check valve means in said second passage preventing fluid flow through said second passage when seated;

a modulator plunger sealingly slidable in said housing and forming a movable wall of said second passage between said check valve means and said modulator valve means, said modulator plunger having a pin unsealingly extending into said second passage, said modulator plunger being movable between an extended position and a withdrawn position to increase and decrease the volume of said second passage and a further extended position wherein said modulator plunger unseatingly engages said check valve means to allow communication of fluid pressure through said second passage;

second pressure responsive means in said housing engaging said modulator plunger;

second spring means acting on said modulator plunger to normally locate said plunger at said extended position thereof;

control valve means being shiftable in response to said sensed condition and receiving operating fluid from said pump means, said control valve means having a normal position channeling fluid at substantially zero pressure to said first and second pressure responsive means, said valve means shiftable in one direction to channel pressurized fluid to said first and second pressure responsive means whereby said modulator valve means is shifted to said second position and said modulator plunger is moved toward said withdrawn position, said valve means shiftable in the other direction to channel pressurized fluid to said first and second pressure responsive members whereby said modulator plunger is moved toward said extended position and said modulator valve is held in said second position, said control valve means shiftable to the normal position channeling fluid at substantially zero pressure to said first and second pressure responsive members whereby said modulator valve means is shifted to said normal position by said first spring means and said plunger is returned to said normal position by said second spring means;

said modulator plunger being movable to said further extended position by maintenance of said control valve means in said other direction whereby said modulator plunger unseatingly engages said check valve means.

References Cited

UNITED STATES PATENTS

| | | | |
|---|---|---|---|
| 3,512,844 | 5/1970 | Stelzer | 303—21 F |
| 3,610,701 | 10/1971 | Riordan | 303—21 F |
| 3,603,649 | 9/1971 | Wilson | 303—21 F |

DUANE A. REGER, Primary Examiner

U.S. Cl. X.R.

188—181 A; 303—21 CG

PO-1050
(5/69)

UNITED STATES PATENT OFFICE
CERTIFICATE OF CORRECTION

Patent No. 3,671,085 Dated September 19, 1972

Inventor(s) J. E. Pasek et al

It is certified that error appears in the above-identified patent and that said Letters Patent are hereby corrected as shown below:

Column 1, line 53, change "pasage" to --passage--. Column 2, line 34, change "or to --of--; line 59, change "FIGS." to --FIG.--. Column 3, line 41, change "engageemnt" to --engagement--. Column 4, line 57, change "passage" to --passages--. Column 5, line 60, after "in" (first occurence) insert --a--. Column 6, line 50, after "variable" insert --volume--; line 51, change "great" to --greater--.

Signed and sealed this 8th day of May 1973.

(SEAL)
Attest:

EDWARD M.FLETCHER,JR.
Attesting Officer

ROBERT GOTTSCHALK
Commissioner of Patents